US007795829B2

(12) United States Patent
Seiler et al.

(10) Patent No.: US 7,795,829 B2
(45) Date of Patent: Sep. 14, 2010

(54) ELECTRIC POWER TOOL AND METHOD FOR OPERATING SAME

(75) Inventors: Hartmut Seiler, Reutlingen (DE); Dirk Lamprecht, Stuttgart-Rohr (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 11/695,969

(22) Filed: Apr. 3, 2007

(65) Prior Publication Data

US 2007/0247097 A1 Oct. 25, 2007

(30) Foreign Application Priority Data

Apr. 7, 2006 (DE) ...................... 10 2006 016 448

(51) Int. Cl.
*H02P 7/00* (2006.01)

(52) U.S. Cl. ....................... 318/432; 318/434; 388/937; 173/176; 173/181

(58) Field of Classification Search ................. 318/432, 318/434, 599, 811; 388/907.5, 930, 937; 173/4, 5, 176, 181
See application file for complete search history.

(56) References Cited

U.S. PATENT DOCUMENTS

| | | | | |
|---|---|---|---|---|
| 3,926,264 | A * | 12/1975 | Bardwell et al. | 173/182 |
| 4,893,067 | A * | 1/1990 | Bhagwat et al. | 388/823 |
| 5,014,793 | A * | 5/1991 | Germanton et al. | 173/181 |
| 5,389,861 | A * | 2/1995 | Warnke, III | 318/10 |
| 6,536,536 | B1 * | 3/2003 | Gass et al. | 173/2 |
| 6,616,446 | B1 | 9/2003 | Schmid | |
| 6,836,614 | B2 * | 12/2004 | Gilmore | 388/811 |
| 7,112,934 | B2 * | 9/2006 | Gilmore | 318/432 |
| 7,235,940 | B2 * | 6/2007 | Bosch et al. | 318/432 |
| 2005/0226692 | A1 | 10/2005 | Makiyama et al. | |

* cited by examiner

*Primary Examiner*—Rina I Duda
(74) *Attorney, Agent, or Firm*—Michael J. Striker

(57) ABSTRACT

In an electric power tool and a method for operating an electric power tool, a torque limitation of an electric motor reacts when a load moment exceeds a predetermined threshold and in which an output request is carried out by means of a switch. A supply of current to the motor is interrupted when a criterion for the reaction of the torque limitation is detected based on a speed detection of the motor.

17 Claims, 2 Drawing Sheets

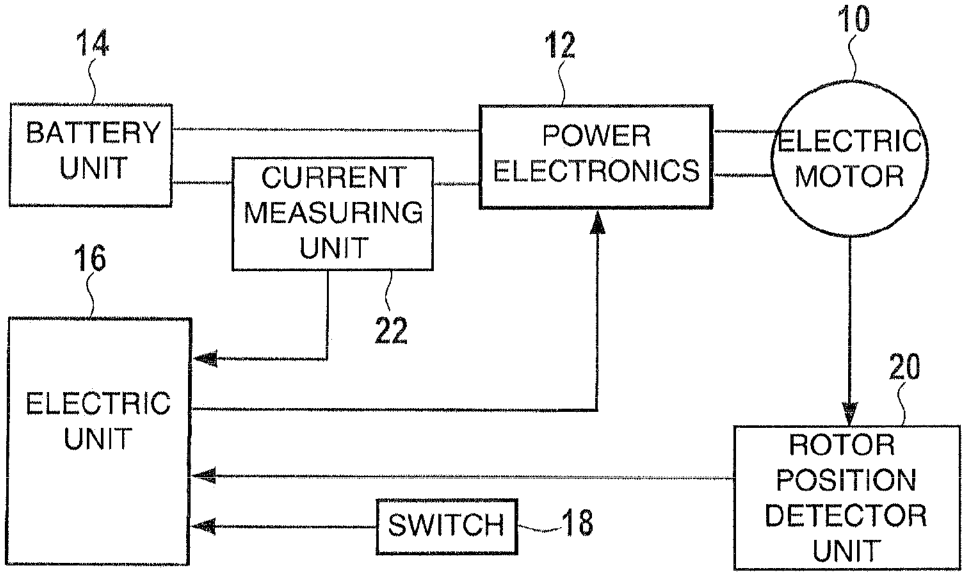
Fig. 2
Fig. 3
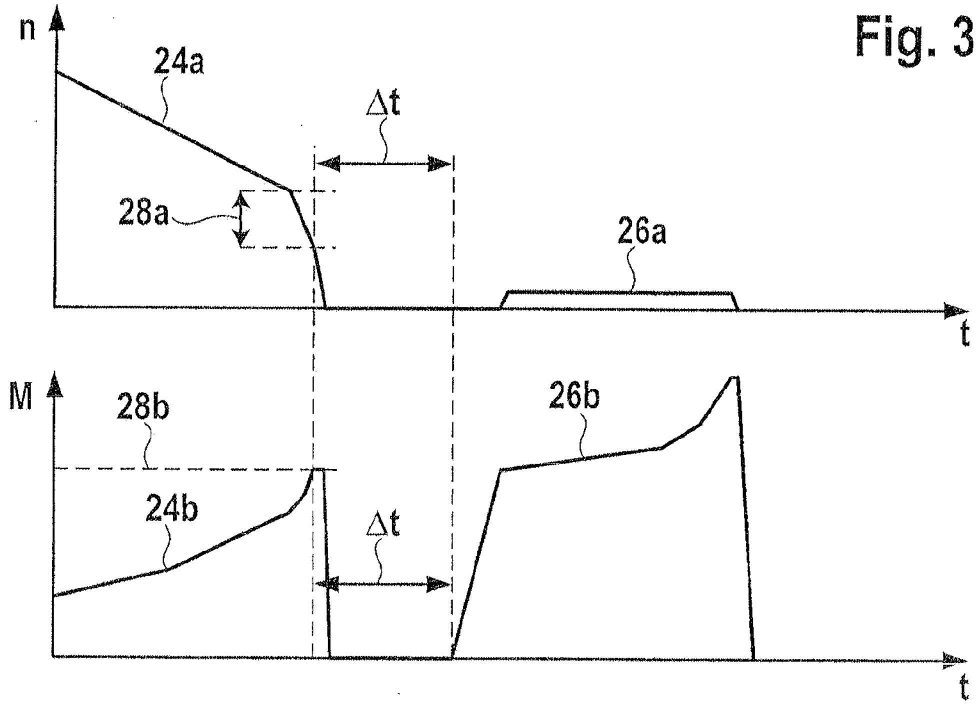

ELECTRIC POWER TOOL AND METHOD FOR OPERATING SAME

CROSS-REFERENCE TO A RELATED APPLICATION

The invention described and claimed hereinbelow is also described in German Patent Application DE 102006016448.2 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a method for operating an electric power tool and an electric power tool according to the preambles to the independent claims.

In known electric power tools, a torque limitation is implemented in a known fashion in that either a mechanical overload clutch on the driven shaft of the transmission periodically interrupts the frictional engagement when a predetermined load moment is reached or the power consumption of the electric motor, which is proportional to the torque, is regulated to a constant value.

As a rule, the value of the desired load moment is preset and is not changed during operation. Usually, the user of the electric power tool makes changes when the motor is switched off. Through the actuation of a pushbutton of the electric power tool by the pressure of the user's finger, the speed of the motor is either changed by means of a pulse width modulation or is preset proportional to the pushbutton position by means of a regulator. When the load moment preset by means of the torque limitation is reached, the moment output by the motor is kept constant either by the mechanical clutch periodically interrupting the frictional engagement or by the motor current being regulated to a constant value.

In the case of the mechanical overload clutch, the motor continues to rotate at an undiminished speed; with the periodic engagement and renewed releasing of the overload clutch, a high torque peak is temporarily exerted on the work piece. In screwdrivers, this leads to the screw being turned a certain amount furthers e.g. with an impulse screwdriver, and can potentially lead to a stripping of the screw. The reaction of the overload clutch is also connected with a significant generation of noise that is often found to be unpleasant.

If the torque is electronically limited through regulation of the motor current, then after the preset load moment has been reached, the motor is supplied with current until the user releases the pushbutton. This also applies to the mechanical torque limitation.

SUMMARY OF THE INVENTION

The invention is based on a method for operating an electric power tool in which a torque limitation of an electric motor reacts when a load moment exceeds a predetermined threshold and in which an output request is carried out by means of a switch.

According to the invention, a supply of current to the motor is interrupted when a criterion for the reaction of the torque limitation is detected based on a speed detection of the motor. Preferably, the motor is an EC motor or a DC motor. Particularly in EC motors with electrical commutation, a speed detection can be achieved for a low cost by means of its conventional rotor position detection. The speed detection can be carried out by means of at least one rotation angle sensor, e.g. a Hall sensor, which is stimulated by a permanent magnet mounted on a motor shaft, or in electronically commutated motors, can also be carried out without a rotation angle sensor through the detection of a magnet wheel voltage (BackEMF) or its third harmonic.

The invention can be used to particular advantage in cordless electric power tools. The interruption of the power supply to the motor is advantageously achieved by means of power electronics of the motor. The interruption is advantageously carried out even if the user leaves the output request unchanged, e.g. leaves a pushbutton in an unchanged position.

According to another independent aspect of the invention, a method for operating an electric power tool is proposed in which a torque limitation of an electric motor reacts when a load moment exceeds a predetermined threshold and in which an output request is carried out by means of a switch and a connection between the motor and a battery unit that powers the motor is interrupted in an at least partially automated fashion when a criterion for the reaction of the torque limitation is detectable.

It is advantageously possible, through a supply of current to the motor after the reaction of the torque limitation, to prevent an unnecessary discharge of the battery unit of a cordless hand-held power tool and a heating of the battery unit. It is also possible to achieve an improvement in the operating function after the reaction of an electronic torque limitation in electric power tools, particularly in screwdrivers and drills.

In cordless hand-held power tools, the continued supply of current to the motor after the reaction of the torque limitation does not offer any advantages, but only the disadvantage that the battery unit is more rapidly discharged and has demand placed on it due to the sometimes high output of current when at rest. The electrical energy stored in the battery unit can therefore be used economically for more effective work of the electric power tool. Less demand is placed on the battery unit since, as is known, with a short, high current output, the heating is more intense than with a longer, but lower current output ($I^2*t$). The service life of the battery unit can be extended by means of the reduced demand.

Preferably, a rapid drop in speed can be used as a criterion. Such a drop in speed is typical when a jam occurs. It is likewise possible, in addition or as an alternative, to use a motor stoppage as a criterion. In this instance, the speed of the motor is zero. The two values are easy to determine by means of a rotor position detection unit.

After reaction of the torque limitation, it is advantageously possible to supply the motor with current again when the output request is reduced and then increased again.

After reaction of the torque limitation, it is also advantageously possible to supply the motor with current again when a predetermined time span has elapsed. This increases operating convenience.

For example, a suitable time span lies between 0.05 and 3 s, preferably between 0.1 and 2 s. The time span can advantageously be selected by a user or can also be preset, for example, at the factory. The time span during which the motor is not supplied with current despite an existing output request, e.g. a depressed switch, is selected so as to give the user enough time to release the switch and reactuate it for a new task if so desired. In this case, it is useful to activate the normal torque limitation again, i.e. the preset torque limitation becomes effective again and the proportionality is reset between the switch position and the requested speed and between the switch position and the pulse width modulation.

If, during the time span or after it elapses, the user maintains or increases the output request by maintaining pressure on the pushbutton, it is advantageous to increase a limit value of the torque limitation when the supply of current resumes. This makes it possible to further increase the operating convenience for the user and also enables a restarting of the motor based on the set torque Imitation. For example, this permits the user to tighten a screw further, while visually monitoring the results.

It is possible to avoid placing too much demand on the user's reactions if a speed of the motor is limited in the event that the torque limitation increases when the supply of current resumes. It is advantageous to limit the speed to a low value, e.g. 0.25 to 4 rps, preferably between 0.5 and 3 rps. This permits the user to better adjust to the required forces, primarily at high load moments.

A typical application, for example, is the drilling of holes in metal with large drill bits. Shortly before the drill bit breaks through the work piece, the load moment abruptly increases due to burr formation in the work piece, which requires very quick reactions on the part of the user. A preferred stopping of the electric motor at a predetermined load moment, which can then increase slowly is extremely useful in this case. The force increase is not abrupt and remains manageable and controlled.

The invention also proposes an electric power tool in which a torque limitation of an electric motor is provided when a load moment exceeds a predetermined threshold and an output request is carried out by means of a switch. Means are provided to interrupt a supply of current to the motor when a criterion for the reaction of the torque limitation is detectable based on a speed detection of the motor. An evaluation of the speed detection or current measurement, the disconnection of the current supply, and the resumption of the current supply are preferably carried out in an electronic unit.

According to an independent aspect of the invention, an electric power tool is proposed, in which a torque limitation of an electric motor is provided when a load moment exceeds a predetermined threshold and in which an output request is carried out by means of a switch and means are provided for interrupting in an at least partially automated fashion a connection between the motor and a battery unit that powers the motor when a criterion for the reaction of the torque limitation is detectable.

This avoids an unnecessary discharge of the battery unit and permits a better use of the capacity of the battery unit.

Preferably, means can be provided for interrupting a supply of current to the motor when a criterion for the reaction of the torque limitation is detectable based on a speed detection of the motor.

It is also useful to provide means for detecting a rapid drop in the speed and/or a stoppage of the motor.

If means are provided for speed limitation upon resumption of the supply of current to the motor, then in the event that a jam occurs, work can be continued while visually monitoring the results.

Other advantages are demonstrated in the following description of the drawings. The drawings depict an exemplary embodiment of the invention. The drawings, the description, and the claims contain numerous defining characteristics in combination. Those skilled in the art will also consider the defining characteristics individually and unite them in other meaningful combinations.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a block circuit diagram for the implementation of the user function for an electric power tool with electronic speed limitation, and FIG. 3 shows a curve of speed and torque as a function of time for a screwdriving operation with torque limitation and final screwdriving with visual monitoring of the results.

DESCRIPTION OF THE PREFERRED EMBODIMENTS

Figure 1:
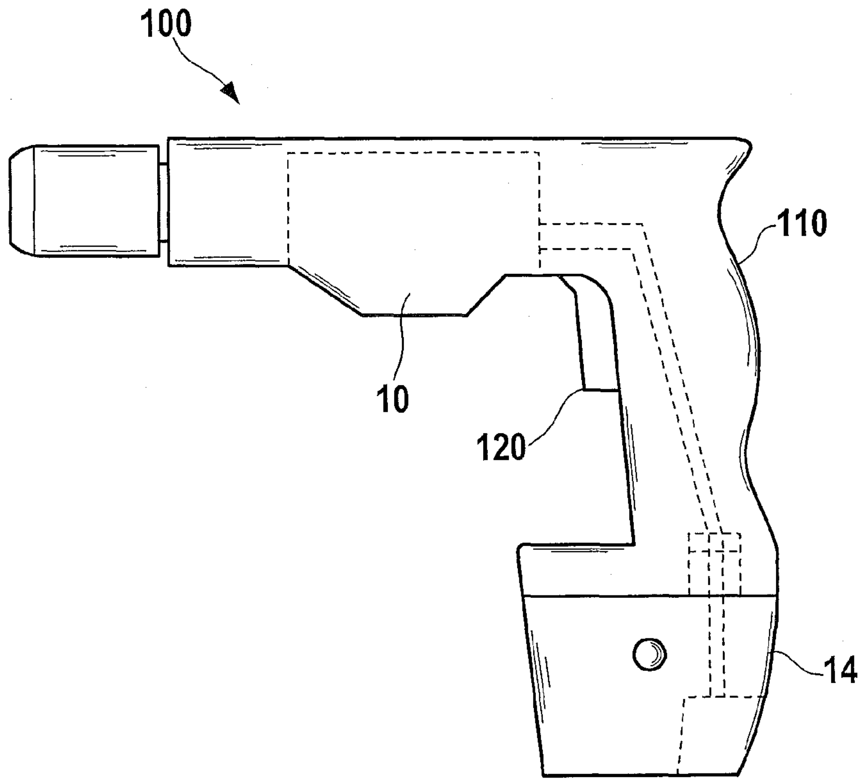
FIG. 1 shows a preferred electric power tool with a battery unit for supplying current to the electric power tool.

FIG. 1 shows an electric power tool 100, which includes an electric motor 10, which can be supplied with current by a battery unit 14 situated in a handle 110 of the electric power tool 100. A switch 120 is provided for actuation of the electric power tool 100. If a torque limitation occurs during operation, then the connection can be interrupted between the battery unit 14 and motor 10, thus reducing demand on the battery unit 14.

FIG. 2 shows a block circuit diagram with the electric motor 10 preferably embodied as an EC motor, equipped with power electronics 12. The battery unit 14 supplies electrical power to the electric power tool. The motor 10, which is preferably embodied as an EC motor or DC motor, has a rotor position detection unit 20, which can detect the rotor position of a rotor of the motor 10. For example, the electric power tool 100 is a cordless drill.

An electronic unit 16 for controlling or regulating the electric power tool receives signals from the rotor position detection unit 20 that are used during normal operation to control of the motor 10, which is embodied as an EC motor.

A current measuring unit 22 detects the current output of the battery unit 14. The detected current value is transmitted to the electronic unit 16.

By means of a switch 18 preferably embodied as a pushbutton, the user sends the electronic unit 16 an output request, for example in order to drill a hole in a work piece that has been brought into operative connection with the drill bit of the electric power tool. The position of the switch 18 embodied as a pushbutton indicates the magnitude of the output request by the user. A speed n of the motor 10 or a conventional pulse width modulation of the current signal, which is supplied to the motor 10, is set proportional to the position of the switch. When the switch 18 embodied as a pushbutton is pressed to its maximum end position, the output request is at its maximum; in a middle position, the output request is correspondingly lower.

Preferably, the jamming detection, the switching off of the current, and the resumption of the current supply to the motor 10 are carried out by the electronic unit 16 and the power electronics unit 12 is triggered accordingly.

The supply of current to the motor 10 is interrupted if a criterion for the reaction of the torque limitation is detected based on a speed detection of the motor 10. A rapid drop in speed and/or a motor stoppage are suitable for use as the criterion.

After reaction of the torque limitation, the motor 10 can be supplied with current again when the output request is reduced, i.e. the switch 18 is released, and then increased again, i.e. the switch 18 is pressed again.

Alternatively, after reaction of the torque limitation, the motor 10 can be supplied with current again when a predetermined time span Δt has elapsed. This will be explained in conjunction with FIG. 3.

An upper characteristic curve 24*a*-26*a* indicates the progression of a speed n and a lower characteristic curve 24*b*-26*b* indicates the progression of a torque M over time t for a screwdriving operation with torque limitation. At a point 28, a criterion of the predetermined torque limitation 28*b* or of the predetermined speed drop 28*a* is reached within a predetermined time and the power electronics 12 interrupts the supply of current to the motor 10 (FIG. 1). The speed n and then the torque M quickly fall to zero.

During the time span Δt, current is not supplied even though the user continues to press the switch 18. After the time span Δt has elapsed, the supply of current to the motor 10 resumes, thus keeping its speed to low values while at the same time slowly increasing a threshold for the torque limitation. In this range, it is possible, for example, to execute a final screwdriving while visually monitoring the results.

It will be understood that each of the elements described above, or two or more together, may also find a useful application in other types of methods and constructions differing from the type described above.

While the invention has been illustrated and described as embodied in an electric power tool and method for operating same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for operating an electric power tool, the method comprising the steps of:

carrying out an output request for the electric power tool operating at a speed by actuating a switch of the electric power tool;

activating a torque limitation of an electric motor of the electric power tool when a load moment exceeds a predetermined threshold, the torque limitation having a torque limit value;

interrupting a current to the electric motor in an at least partially automatic fashion when a criterion for activating the torque limitation is detected; and supplying, when a predetermined time span has elapsed, the electric motor with the current again and increasing the torque limit value while keeping the speed to a low speed value between 0.5 and 3 rps.

2. A method as defined in claim 1; wherein interrupting the current is by interrupting a connection between the electric motor and a battery unit that powers the electric motor.

3. A method as defined in claim 1; wherein interrupting the current is by interrupting a connection between the electric motor and a battery unit that powers the electric motor in an at least one partially automated fashion.

4. A method as defined in claim 1; and further comprising deriving the criterion from a speed detection of the electric motor.

5. A method as defined in claim 1; and further comprising using as the criterion a criterion selected from the group consisting of a rapid drop in the speed of the electric motor, a stoppage of the electric motor, and both.

6. A method as defined in claim 1, wherein the electric motor is supplied with the current again when the output request is reduced and then increased again.

7. A method as defined in claim 1, wherein the predetermined time span is predetermined by a user.

8. A method as defined in claim 1, wherein during the predetermined time span, a state of the output request is one of being maintained and being increased.

9. An electric power tool, comprising:

an electric motor;

a switch by which an output request is carried out for the electric power tool operating at a speed;

means for activating a torque limitation of said electric motor when a load moment exceeds a predetermined threshold, the torque limitation having a torque limit value; and means for interrupting a current to said electric motor when a criterion for an activation of the torque limitation is detected, wherein when a predetermined time span has elapsed, the electric motor is supplied with the current again and the torque limit value is increased while the speed is kept to a low speed value between 0.5 and 3 rps.

10. An electric power tool as defined in claim 9; wherein the criterion is derived from a speed detection of said electric motor.

11. An electric power tool as defined in claim 9; and further comprising means for detecting a rapid drop in a parameter selected from the group consisting of a speed of said electric motor, a stoppage of said electric motor, and both.

12. An electric power tool as defined in claim 9; and further comprising means for speed limitation upon resumption of the current.

13. An electric power tool, comprising:

an electric motor;

a switch by which an output request is carried out for the electric power tool operating at a speed;

means for activating a torque limitation of said electric motor when a load moment exceeds a predetermined threshold, the torque limitation having a torque limit value; and means for interrupting in an at least partially automated fashion a connection between said electric motor and a battery unit that powers said electric motor when a criterion for an activation of the torque limitation is detected, wherein the connection is resumed when a predetermined time span has elapsed, and the torque limit value is increased while the speed is kept to a low speed value between 0.5 and 3 rps.

14. An electric power tool as defined in claim 13; wherein the criterion is derived from a speed detection of said electric motor.

15. An electric power tool as defined in claim 13; and further comprising means for detecting a rapid drop in a parameter selected from the group consisting of a speed of said electric motor, a stoppage of said electric motor, and both.

16. An electric power tool as defined in claim 13; and further comprising means for speed limitation upon resumption of the connection.

17. A method for operating an electric power tool, the method comprising the steps of:

carrying out an output request for the electric power tool operating at a speed by actuating a switch of the electric power tool;

activating a torque limitation of an electric motor of the electric power tool when a load moment exceeds a predetermined threshold, the torque limitation having a torque limit value;

interrupting a connection between the electric motor and a power source that powers the electric motor when a criterion for an activation of the torque limitation is detected; and resuming the connection and increasing the torque limit value while keeping the speed to a low speed value between 0.5 and 3 rps when a predetermined time span has elapsed.

* * * * *